United States Patent [19]

Mauk et al.

[11] 4,348,709

[45] Sep. 7, 1982

[54] ELECTRONIC LOAD PROTECTION CIRCUIT

[76] Inventors: Ernest R. Mauk, 4991 Ormand Rd., Davisburg, Mich. 48019; William A. Van Norman, 2055 Wardlow, Highland, Mich. 48031

[21] Appl. No.: 216,508

[22] Filed: Dec. 15, 1980

[51] Int. Cl.³ .............................................. H02H 3/38
[52] U.S. Cl. ..................................... 361/92; 361/93; 361/100
[58] Field of Search ................... 361/79, 100, 92, 93, 361/101, 30, 31; 307/252 UA, 200 A; 340/663, 664

[56] References Cited

U.S. PATENT DOCUMENTS

| | | | |
|---|---|---|---|
| 3,265,933 | 8/1966 | Perry et al. | 307/252 UA X |
| 3,325,684 | 6/1967 | Berger | 317/23 |
| 3,386,005 | 5/1968 | Roland et al. | 317/22 |
| 3,407,338 | 10/1968 | Secunde | 317/22 |
| 3,409,802 | 11/1968 | Savage | 361/79 |
| 3,539,869 | 11/1970 | Blashfield | 317/33 |
| 3,548,259 | 12/1970 | McDonald | 317/31 |
| 3,562,589 | 2/1971 | Myers | 317/31 |
| 3,582,713 | 6/1971 | Till | 317/31 |
| 3,590,325 | 6/1971 | McMillen | 317/31 |
| 3,657,603 | 4/1972 | Adams | 317/16 |
| 3,740,738 | 6/1973 | Kosanovich et al. | 317/31 |
| 3,748,569 | 7/1973 | Frank et al. | 323/9 |
| 3,772,568 | 11/1973 | Phillips | 317/13 A |
| 3,777,188 | 12/1973 | Mazur | 307/252 UA X |
| 3,800,189 | 3/1974 | Montz | 317/18 D |
| 3,818,273 | 6/1974 | Nakashima et al. | 317/22 |
| 3,836,821 | 9/1974 | Wahlgren et al. | 317/18 D |
| 3,843,908 | 10/1974 | Priegnita | 317/31 |
| 3,852,653 | 12/1974 | Kuroda et al. | 320/64 |
| 4,150,411 | 4/1979 | Howell | 361/45 |
| 4,158,150 | 6/1979 | Dever | 307/252 UA X |
| 4,160,282 | 7/1979 | Dolinar et al. | 361/31 |

*Primary Examiner*—Reinhard J. Eisenzopf
*Attorney, Agent, or Firm*—Gifford, VanOphem, Sheridan and Sprinkle

[57] ABSTRACT

A load protecting circuit includes a triac connected in series with the load to provide an open circuit when a voltage drop or current surge is applied to the load. The triac is gated through a transistorized gating circuit which includes a zero-crossing detector so that the gate of the triac is turned on or off only during zero-crossing points of the AC line voltage. The gating circuit is responsive to a voltage drop detector comprising a photo-optical isolator which turns off as the voltage drop in the input line drops below a predetermined value and, thus, turns off the gating current to the triac. The current surge protector comprises a transistor of reverse polarity from the transistors contained in the gating circuit so that a gate current derived from the current surge and applied to the transistor turns off the activating current for the gating circuit. The device also includes a varistor for protection against spike voltage impulses and a radio frequency suppression line.

9 Claims, 1 Drawing Figure

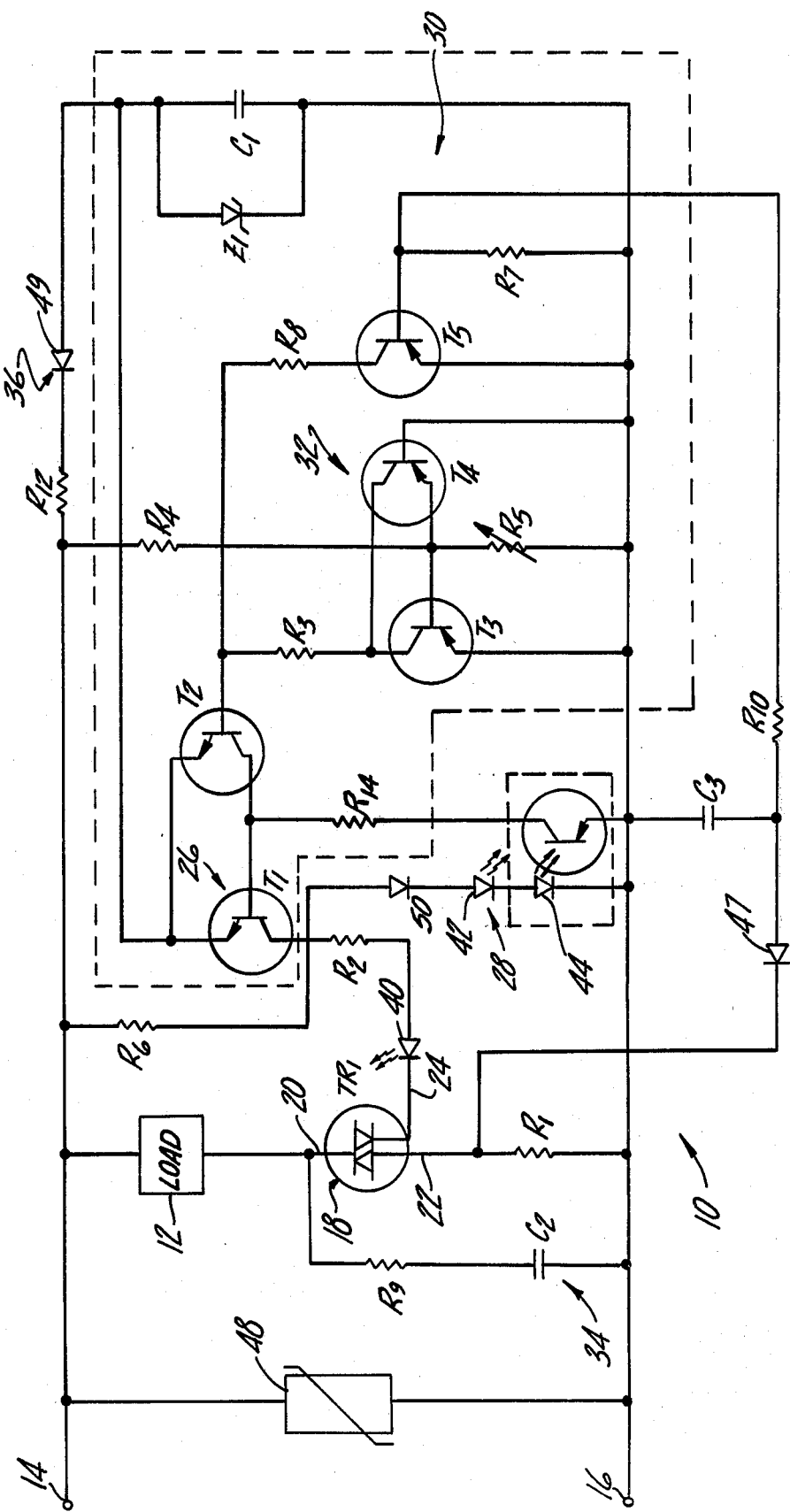

ELECTRONIC LOAD PROTECTION CIRCUIT

BACKGROUND OF THE INVENTION

I. Field of the Invention

The present invention relates generally to an electronic circuit for protecting an electrical load from damage due to voltage drops or current surges applied to the load, and more particularly, to such a circuit with a condition responsive switch which is activated only during zero-crossings of the AC line driving load.

II. Description of the Prior Art

Commonly known household appliances often include an electric motor which is powered by conventional AC current from a standard power outlet. These motors are constructed for operation at a particular rated voltage and current. Although the rated voltage and current is generally supplied to the motor by the standard power source, abnormal conditions can occur which significantly drop the voltage applied to the load or which produce a current surge to the load. These changes in voltage and current applied to the load can severely damage the windings and other components of the electrical motor, especially as a result of the overheating which occurs during these changes. Further damage is also caused from abnormally high instantaneous voltage spikes which can be imposed upon a power line by lightning.

One previously known device for protecting a load from abnormal voltage or current conditions is to use a thermally activated circuit breaker or fuse. Typically, a fuse comprises a very thin conductor which breaks apart when heated as abnormally high currents pass through the conductor and thus, these devices are quite simple, inexpensive, and small. On the other hand, the circuit breakers comprise a simple switch which opens when heated by the high current. Nevertheless, both of these devices are disadvantageous because they do not respond quickly enough to the change in circuit parameters until after the abnormal condition has occurred and been applied to the load for a short time. Moreover, once the fuse has opened, it is destroyed and must be replaced. The circuit breaker must be manually reset to its closed position. Thus, neither of these devices recloses the circuit automatically.

Another previously known form of load protector comprises the use of a switching device or switching circuit which is activated by a sensor used to detect abnormal voltages or currents applied to the load. These previously known switching devices are disadvantageous for the reason that they can induce radio frequency interference when the switch is turned on and off. Moreover, the switches are typically made responsive to a single circuit condition such as voltage changes or current changes, but not both. For example, in U.S. Pat. No. 3,657,603 to Adams, a relay control is disclosed which is responsive to only overvoltage and undervoltage conditions of the line voltage applied to the load. In addition, other previously known switching circuits are often quite complex and thus expensive to produce. Furthermore, they often utilize relay coils which substantially increase the physical size of the circuit such that miniaturization incident to the use of microelectronics is not possible with these circuits.

SUMMARY OF THE PRESENT INVENTION

The present invention overcomes the above-mentioned disadvantages by providing a switching circuit which interrupts the electrical power flow to the load in response to current surges as well as undervoltage conditions applied to the load, whereby power to the load is automatically restored once the abnormal condition has ceased. The circuit is transistorized so that the circuit is adaptable for microelectronic construction.

The device generally comprises a solid state switching device connected in series with the load between the input line terminals. The switching device is gated by an AC line operated, zero crossing switch means so that the switching device is switched on and off only during zero-crossings (i.e. instantaneous zero voltage points of the sinusoidal line voltage) of the power line voltage. In this manner, the switching means does not induce radio frequency interference in the power line or radiate such interference into nearby television or radio receivers.

The gating means is responsive to a first sensing means for detecting a voltage drop in the line voltage and a second sensing means for detecting an excess of current being applied to the load. Each sensing means produces a signal in response to low voltage or current surge conditions, respectively, which is conducted to the gating means to control the operation of the switching means. Preferably, each of the sensing means includes a visual indicator to provide a visible indication that the respective sensing means has detected an abnormal circuit condition.

Preferably, the circuit also includes radio frequency interference suppression means and a voltage spike protector so that the load is operated only under substantially ideal operating conditions. In any event, the load protecting circuit of the present invention is easily adapted for use with a wide variety of loads having different power ratings by replacement of the second sensing means and solid state switching device so that they are operative in accordance with the current value at which the power to the load is to be terminated.

BRIEF DESCRIPTION OF THE DRAWING

The present invention will be more clearly understood by reference to the following detailed description of the preferred embodiment when read in conjunction with the accompanying drawing in which:

The FIGURE is a schematic diagram of the preferred embodiment of a load protecting circuit of the present invention.

DETAILED DESCRIPTION OF THE PREFERRED EMBODIMENT OF THE PRESENT INVENTION

Referring to the FIGURE, the load protector 10 is thereshown connected to the terminals of the load 12. The power line applied to the load 12 is indicated by terminals 14 and 16. A switching device 18 comprises a triac TR1 and is connected in series with the load 12 between the terminals 14 and 16 of the input line. The gate 24 of the switching device 18 is in turn connected to transistorized gating means 26. The gating means 26 is responsive to a first condition sensing means 28 and a second condition sensing means 30 which are connected to the input line 14 and the output line 22 of the switch means 18, respectively. The gating means 26 includes a zero-crossing detector means 32 which is also connected to the input line terminal 14. Appropriate biasing means 36 maintains the gating circuit output at a predetermined level for proper operation of the switch means 18.

The switch means 18 comprises a triac TR1 having a first main terminal 20 secured to the load 12 and its second main terminal 22 connected to the input line terminal 16 through resistor R1. The gate 24 of triac TR1 is connected to a light emitting diode 40 to provide a visual indication when current is flowing through the gate 24 from the gating means 26. The bias resistor R2 is connected in series with the diode to limit the current applied to the gate 24 from the gating means 26.

The gating means 26 comprises a pair of NPN transistors T1 and T2. The emitters of the transistors T1 and T2 are connected together, although the collector of T2 is connected to the base of T1. The collector of T1 forms the output of the gating means 26 and is, therefore, secured to the resistor R2. The base of transistor T2 is connected to the output from the zero-crossing sensing means 32.

A rectifier network 36 provides the DC voltage to operate the gating circuit 26. This biasing means includes the series connection of resistor R12 and diode 49 which rectifies and limits the maximum voltage at the emitter-emitter junction of transistors T1 and T2. The biasing means further comprises a zener diode Z1 connected in parallel with the capacitor C1 between the line input terminal 16 and the emitter-emitter junction for the transistors T1 and T2. The emitter-emitter junction is, therefore, limited to an appropriate operating voltage. In a certain but typical circuit according to the present invention, the example, the voltage is maintained at about 10 volts.

Zero-crossing sensing means 32 comprises a pair of PNP transistors T3 and T4. The collectors of the transistors T3 and T4 are connected together so as to form a trigger for the base of transistor T2. The combined outputs of the collectors of the transistors T3 and T4 are fed through resistor R3 to the base of the transistor T2 to limit the voltage applied to the base of transistor T2. The base of transistor T4 is connected to input line terminal 16 and the emitter of that transistor is connected to the base of the transistor T3. The emitter of transistor T3 is also connected to the input line terminal 16. The emitter-base junction of the transistors T3 and T4 is connected to the input line terminal 14 through resistor R4 and is connected to the input line terminal 16 through variable resistor R5. Resistors R4 and R5 provide appropriate bias to the emitter-base junction of the transistors T4 and T3 so that the output produced from the zero-crossing sensing means 32 is appropriately limited to produce the necessary base voltage at the transistor T2 while corresponding with the sinusoidal variations of the line voltage. In a certain but typical circuit according to the present invention, the value for the voltage at the base-emitter junction of transistors T3 and T4 would be about 5 volts.

The first sensing means 28 comprises a photo-optical isolator P1 which utilizes a light emitting diode 44 to provide a gate voltage. The collector of the photo-optical isolator P1 is connected to the base of the transistor T1 while the emitter is connected to the input line terminal 16. The light emitting diode 42 is connected through a resistor R6 to the input line terminal 14 while its cathode terminal is connected in series with the light emitting diode 44 of photo-optical isolator P1 to the input line terminal 16.

The second sensing means 30 comprises a PNP transistor T5 whose base is biased by series network R1, R10 and D47. A current sample from the load current passing through resistor R1 is rectified by diode 47. The rectified voltage is dropped across resistor R10 to provide the base bias for transistor T5. T5 is normally in an off state until the sample current provides a base voltage in excess of a predetermined amount which is governed by selection of the value of R1. R1 is appropriately connected between input terminal 16 and main terminal 22 of triac TR1.

Additional biasing of transistor T5 is provided with respect to the input line terminal 16 through the resistor R7. The emitter of transistor T5 is also secured to the input line terminal 16. The collector of transistor T5 is connected to the base of transistor T2 through the resistor R8.

The circuit 10 also includes radio frequency suppression means 34 secured between the load and the input line terminal 16. The radio suppression means comprises a resistor R9 connected in series with the capacitor C2 between the line input terminal 16 and the junction between the load 12 and triac TR1. A voltage spike protector is also included in the circuit 10 and comprises a varistor 48 connected across the line input terminals 14 and 16. In addition, the border line 80 designates the portion of the circuit 10 which can be advantageously constructed as an integrated circuit chip.

Having thus described the important structural features of the preferred embodiment of the present invention, the operation of the load protecting circuit is easily understood by the following general description.

The triac TR1 is secured in series with the load 12 so that the triac open circuits the load from the input line terminals when no current is fed to the gate 24 of the triac. However, under normal operation, the gate is supplied with current from the gating means 26 and permits current to flow across the triac and thus through the load 12. During normal operation, the light emitting diode 40 provides a visual indication that the gate is operative.

Also, during normal operation, the undervoltage detector 28 is operative to provide a gating current to the base of the transistor T1. The light emitting diode 44 is turned on and thus provides a gate current to the photo-optical isolator P1. However, when the voltage between the input line terminals 14 and 16 drops below a predetermined value as determined by the resistor R6, the diode 44 turns off, thus turning off the gate of the photo-optical isolator such that photo-optical isolator P1 no longer provides a base current to the transistor T1. Nevertheless, since the base of the transistor T1 is connected to the collector of the transistor T2, the transistor T1 continues to conduct current to the gate 24 until the zero-crossing detector 32 eliminates the base voltage at the base of transistor T2. Thus, the current to the gate 24 is switched off only during a zero-crossing point in the AC input line voltage.

Conversely, when the input line voltage again approaches its nominal value, the photo-optical isolator again produces a collector current which is fed to the base of transistor T1. As the line voltage makes the next zero crossing, the transistor T2 is activated by the zero-crossing sensing means 32 and the transistor T1 is provided with a base current. Thus, the transistor T1 provides current to the gate 24, closing the switch means 18 and restoring current to the load 12.

As can also be seen, the base of the transistor T2 is normally supplied with a gate current from the transistors T3 and T4. However, when an excessive current flows through the load line and thus across resistor R1, the rectified current applied to the base of the transistor T5 is of a magnitude and polarity that turns on transistor T5. Activation of transistor T5 increases the base current to transistor T2 and drives transistor T2 into saturation. At that point, the collector of the transistor T2 no longer provides sufficient base current to activate the transistor T1. Consequently, the gate current through R2 to the gate 24 of triac TR1 is cut off at the next zero-crossing in the AC line voltage. Thus, the triac TR1 does not fire and open circuits the load from the input line terminals 14 and 16. Nevertheless, when the load current again reaches an acceptable level, transistor T5 is cut off so that at the next zero-crossing of the line voltage, the gating means 26 again closes the triac switch in the manner previously described.

The radio frequency suppression means 34 of the present circuit comprises a series combination of the resistor R9 and capacitor C2 connected in parallel across the triac TR1 from its terminal 20 to input terminal line 16. Consequently, in the event that radio frequency interference is induced as a result of the switching on and off of triac TR1, the condenser/resistor network 34 suppresses it and prevents it from being radiated to nearby television or radio receivers. Thus, this circuit complements the zero-crossing switching means which, ideally, but may not completely, avoids the introduction of radio frequency interference. It is also important to note that the varistor 48 secured across the input line terminals 14 and 16 serves to absorb any instantaneous voltage peak applied to the input power lines by lightning or another unexpected spike of voltage imposed upon the power line.

Having thus described my invention, many modifications thereto will become apparent to those skilled in the pertinent art without departing from the scope and spirit of the invention as defined by the scope of the appended claims.

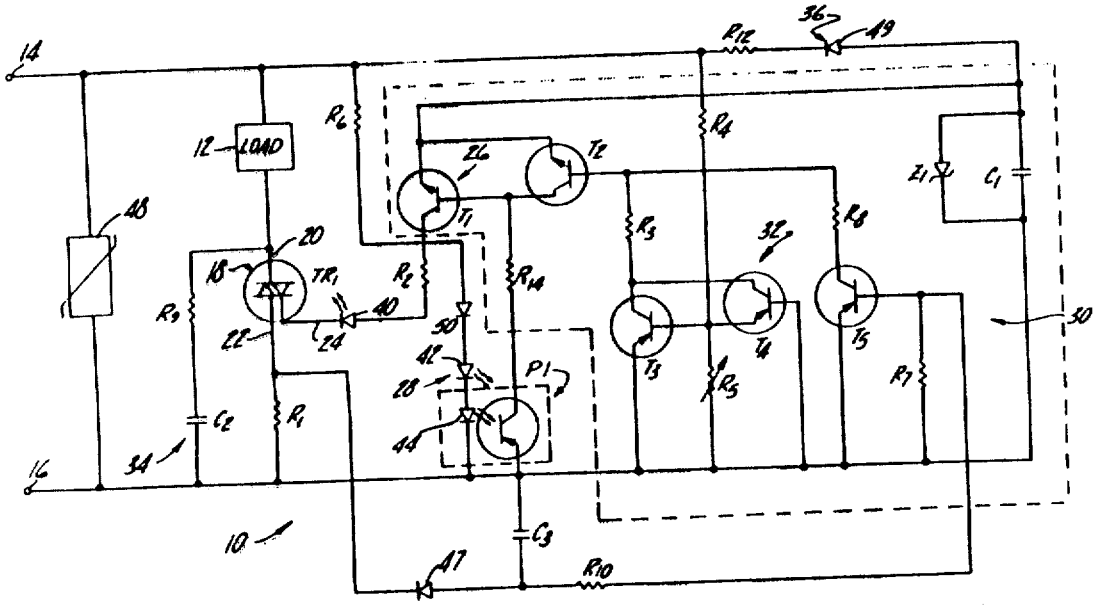

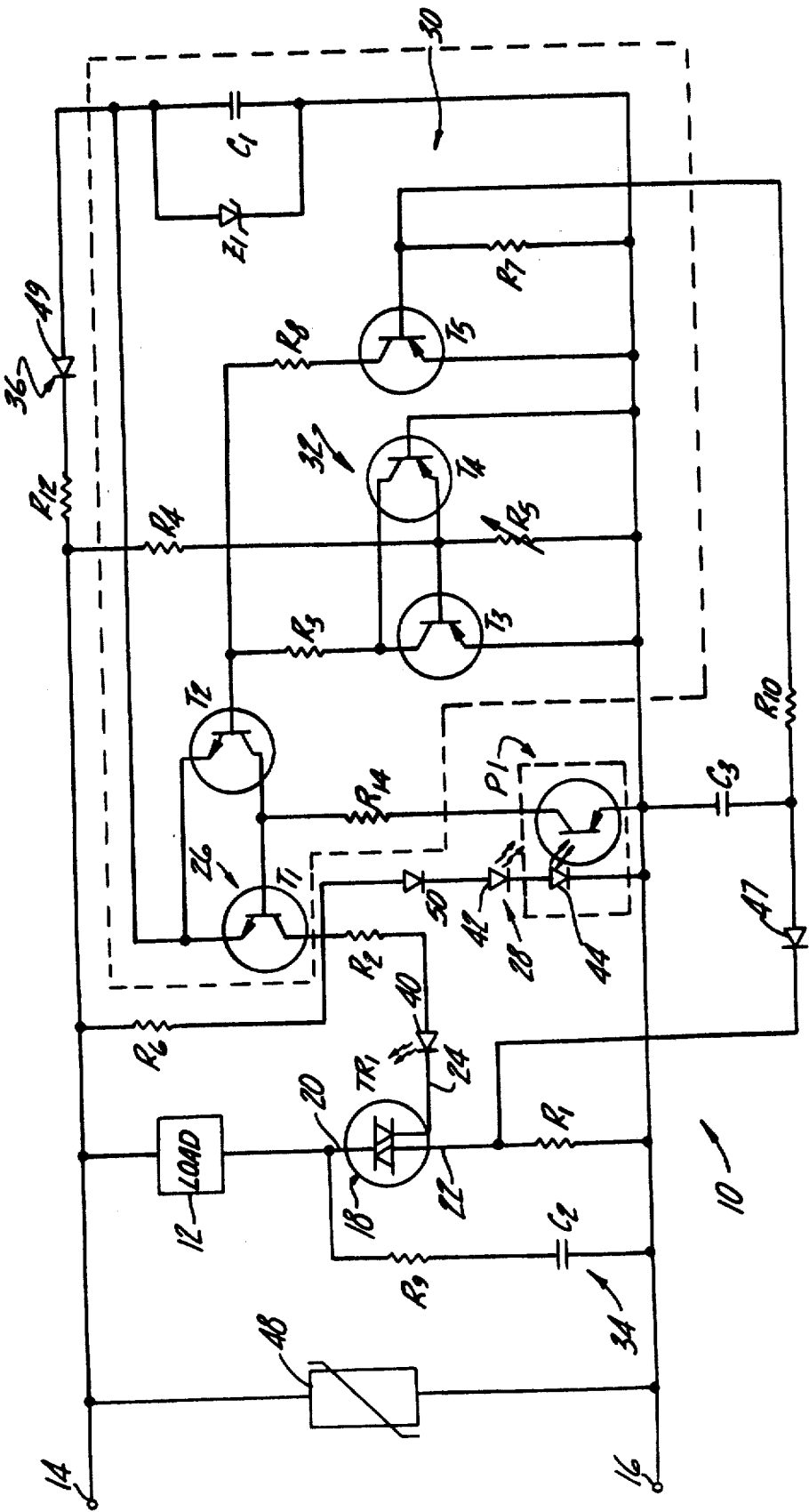

What is claimed is:

1. A load protecting circuit for interrupting current flow to the load line during voltage drops or current surges in the AC power line comprising:
   a first means for sensing a voltage drop in the power line;
   a second means for sensing excessive current applied to the load line;
   switching means for interrupting and restoring current in the load; and
   gating means powered by said AC power line exclusively of any separate source responsive to said first and second means for automatically operating the switching means, said gating means comprising an AC line operated, zero-crossing switch means having means for sensing the zero-crossings of the AC line, whereby power for operating the switching means is derived only from the AC line.

2. The invention as defined in claim 1 wherein said first means comprises a photo-optical isolator and a light emitting diode.

3. The invention as defined in claim 1 wherein said second means comprises a transistor gated to the AC load line through a diode.

4. The invention as defined in claim 1 and further comprising means for absorbing a high voltage spike imposed upon the AC line.

5. The invention as defined in claim 4 wherein said means comprises a varistor.

6. The invention as defined in claim 1 and further comprising means for suppressing radio-frequency interference signals radiated by said circuit.

7. The invention in claim 1 wherein said first means includes perceptible indicator means for indicating when said first means has sensed a voltage drop.

8. The invention as defined in claim 1 and further comprising perceptible indicator means for indicating the presence of a signal from said gating means.

9. The invention as defined in claim 1 wherein said gating means includes means for biasing said gating circuitry at a predetermined operating voltage which is derived from the AC line voltage.

* * * * *

UNITED STATES PATENT AND TRADEMARK OFFICE
CERTIFICATE OF CORRECTION

PATENT NO. : 4,348,709

DATED : September 7, 1982

INVENTOR(S) : Ernest R. Mauk et al

Page 1 of 3

It is certified that error appears in the above-identified patent and that said Letters Patent is hereby corrected as shown below:

The title page should be deleted to appear as per attached title page.

The sheet of drawing containing figure 1 should be deleted to appear as per attached sheet.

Signed and Sealed this

Twenty-sixth Day of April 1983

[SEAL]

Attest:

GERALD J. MOSSINGHOFF

Attesting Officer

Commissioner of Patents and Trademarks

United States Patent [19]

Mauk et al.

[11] 4,348,709
[45] Sep. 7, 1982

[54] ELECTRONIC LOAD PROTECTION CIRCUIT

[76] Inventors: Ernest R. Mauk, 4991 Ormand Rd., Davisburg, Mich. 48019; William A. Van Norman, 2055 Wardlow, Highland, Mich. 48031

[21] Appl. No.: 216,508

[22] Filed: Dec. 15, 1980

[51] Int. Cl.³ .................................... H02H 3/38
[52] U.S. Cl. .............................. 361/92; 361/93; 361/100
[58] Field of Search ............ 361/79, 100, 92, 93, 361/101, 30, 31; 307/252 UA, 200 A; 340/663, 664

[56] References Cited

U.S. PATENT DOCUMENTS

| | | | |
|---|---|---|---|
| 3,265,933 | 8/1966 | Perry et al. | 307/252 UA X |
| 3,325,684 | 6/1967 | Berger | 317/23 |
| 3,386,005 | 5/1968 | Roland et al. | 317/22 |
| 3,407,338 | 10/1968 | Secunde | 317/22 |
| 3,409,802 | 11/1968 | Savage | 361/79 |
| 3,539,869 | 11/1970 | Blashfield | 317/33 |
| 3,548,259 | 12/1970 | McDonald | 317/31 |
| 3,562,589 | 2/1971 | Myers | 317/31 |
| 3,582,713 | 6/1971 | Till | 317/31 |
| 3,590,325 | 6/1971 | McMillen | 317/31 |
| 3,657,603 | 4/1972 | Adams | 317/16 |
| 3,740,738 | 6/1973 | Kosanovich et al. | 317/31 |
| 3,748,569 | 7/1973 | Frank et al. | 323/9 |
| 3,772,568 | 11/1973 | Phillips | 317/13 A |
| 3,777,188 | 12/1973 | Mazur | 307/252 UA X |
| 3,800,189 | 3/1974 | Muntz | 317/18 D |
| 3,818,273 | 6/1974 | Nakashima et al. | 317/22 |
| 3,836,821 | 9/1974 | Wahlgren et al. | 317/18 D |
| 3,843,908 | 10/1974 | Priegnita | 317/31 |
| 3,852,653 | 12/1974 | Kuroda et al. | 320/64 |
| 4,150,411 | 4/1979 | Howell | 361/45 |
| 4,158,150 | 6/1979 | Dever | 307/252 UA X |
| 4,160,282 | 7/1979 | Dolinar et al. | 361/31 |

Primary Examiner—Reinhard J. Eisenzopf
Attorney, Agent, or Firm—Gifford, VanOphem, Sheridan and Sprinkle

[57] ABSTRACT

A load protecting circuit includes a triac connected in series with the load to provide an open circuit when a voltage drop or current surge is applied to the load. The triac is gated through a transistorized gating circuit which includes a zero-crossing detector so that the gate of the triac is turned on or off only during zero-crossing points of the AC line voltage. The gating circuit is responsive to a voltage drop detector comprising a photo-optical isolator which turns off as the voltage drop in the input line drops below a predetermined value and, thus, turns off the gating current to the triac. The current surge protector comprises a transistor of reverse polarity from the transistors contained in the gating circuit so that a gate current derived from the current surge and applied to the transistor turns off the activating current for the gating circuit. The device also includes a varistor for protection against spike voltage impulses and a radio frequency suppression line.

9 Claims, 1 Drawing Figure